July 2, 1957  A. W. SEYFRIED  2,797,901
EJECTOR FOR DISCONNECTING TOOL SHAFTS
FROM MOTOR DRIVEN POWER UNIT
Filed Jan. 16, 1956  2 Sheets-Sheet 1

INVENTOR.
ARTHUR W. SEYFRIED
BY Bertha L. MacGregor
ATTORNEY

INVENTOR.
ARTHUR W. SEYFRIED
BY Bertha L. MacGregor
ATTORNEY

United States Patent Office 2,797,901
Patented July 2, 1957

2,797,901

EJECTOR FOR DISCONNECTING TOOL SHAFTS FROM MOTOR DRIVEN POWER UNIT

Arthur W. Seyfried, Racine, Wis., assignor to Scovill Manufacturing Company, Waterbury, Conn., a corporation of Connecticut Application January 16, 1956, Serial No. 559,477

6 Claims. (Cl. 259—1)

This invention relates to ejector mechanism for disconnecting tool shafts from motor driven power units, and more particularly to ejector means for disconnecting and removing the beater shafts from the power units of motor driven food mixers.

Motor driven food mixers comprise an encased motor, attached gear unit and a pair of beaters having shafts rotatably mounted in the gear unit. To facilitate removal of the beater shafts from the mixer for the purpose of cleansing them after use, I have provided manually actuated ejector mechanism mounted in the gear unit of the food mixer whereby the beater shafts can be disconnected from their respective drive shafts and be removed from the power unit easily and quickly. The disconnection and removal of the beaters can be achieved without touching the beaters.

An important feature of my invention is the provision of means in the ejector for disconnecting one of the beater shafts of the pair from its drive shaft in the gear unit before the other of said shafts is engaged by the ejector for disconnecting it from its drive shaft. The advantage of this construction lies in the fact that the pressure or effort required to actuate the ejector is only one half of that which would be necessary if both beater shafts were ejected at the same time.

The ejector mechanism also includes means for automatically returning the ejector to normal position after it has been actuated to eject the beater shafts.

Other objects and advantages of the construction will be apparent from the drawings and following specification.

Figure 1:
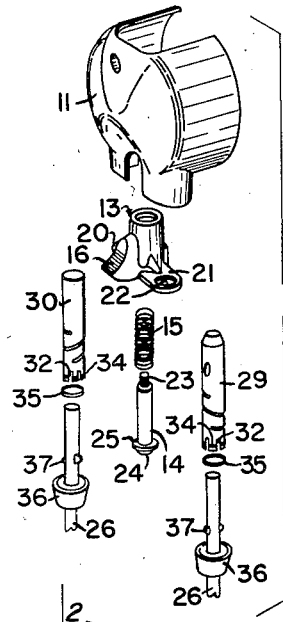
Fig. 1 shows a food mixer gear housing, ejector parts, drive shafts and upper portions of beater shafts embodying my invention, the several parts being shown disassembled and in perspective.

The ejector mechanism embodying my invention in its preferred form is shown in the drawings as mounted in a motor driven food mixer comprising an encased motor 10, gear housing 11 attached to the motor, and a handle 12 connected to the motor and gear housings.

Figure 6:
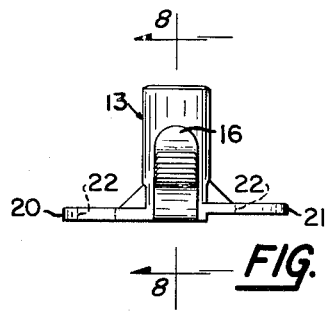
Fig. 6 is a front elevation of the same.
Figure 7:
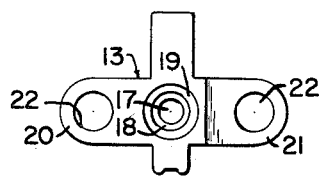
Fig. 7 is a bottom view of the detached ejector.
Figure 8:
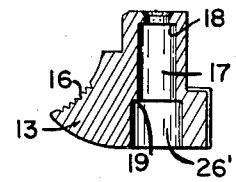
Fig. 8 is a vertical sectional view taken in the plane of the line 8—8 of Fig. 6.

The ejector comprises a die cast ejector body 13, bolt 14 and coiled spring 15, shown disassembled in Fig. 1. The body 13 has an exposed serrated face 16 which is concave and extends downwardly and outwardly from the front of the gear housing 11. The body 13 is vertically bored midway between its sides as indicated at 17 in Fig. 8; the bore 17 being of three different diameters whereby shoulders 18 and 19 are provided in the bore for a purpose to be described. At opposite sides of the bore 17, the ejector body has laterally extending ejector arms 20 and 21, each provided with an aperture 22. The ejector arm 20 is in a plane slightly lower than the arm 21, as shown in Fig. 6.

The bolt 14 has a reduced threaded upper end 23 and, at its opposite end, an enlarged head 24 having a flat upper surface 25. The coiled spring 15 surrounds the bolt 14, with its lower end bearing on the surface 25 of the head 24. The diameter of the head 24 is such that it fits within the portion 26' of the bore 17 (Fig. 8) below the shoulder 19 in the ejector body 13. The bolt 14, with coiled spring 15 surrounding it, fits within the bore 17 below the shoulder 18.

Figure 2:
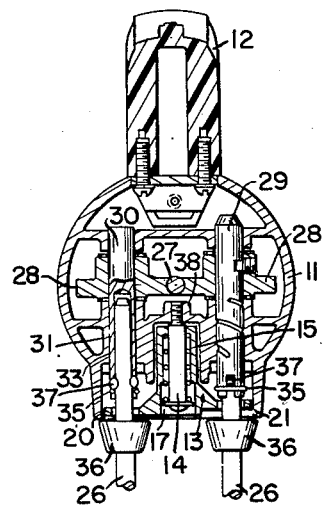
Fig. 2 is a transverse vertical sectional view through the forward portion of a food mixer embodying my invention, taken in the plane of the line 2—2 of Fig. 3, showing the drive shafts, beater shafts and part of the ejector mechanism in elevation.
Figure 3:
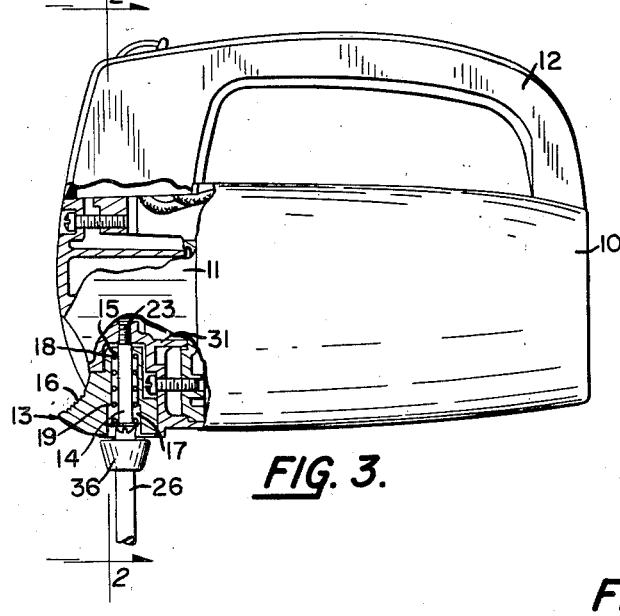
Fig. 3 is an elevational side view of a food mixer embodying my invention, showing part of the gear unit and ejector in vertical section.
Figure 4:
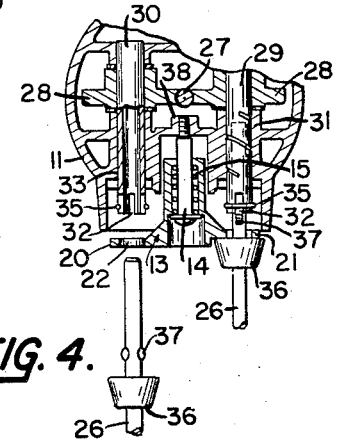
Fig. 4 is a view similar to Fig. 2, showing the ejector after it has been actuated to eject one of the beater shafts, and ready to disconnect the other beater shaft from its drive shaft when continued downward pressure is applied to the ejector.
Figure 5:
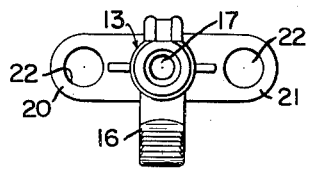
Fig. 5 is a top plan view of the ejector detached from the rest of the mixer.

As best shown in Figs. 2 and 4, the gear housing 11 has mounted therein the mechanism for rotating the beater shafts 26. This mechanism includes the motor driven horizontally disposed worm shaft 27 and worm gears 28 fixedly mounted on the rotatable drive shafts 29 and 30, respectively, in the casting 31, which may be integral with the housing 11. The shafts 29 and 30 rotate in opposite directions, as is well understood in the art.

Figure 9:
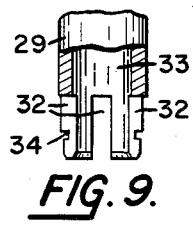
Fig. 9 is a vertical sectional view, partly in elevation, of the lower end of one of the beater drive shafts.
Figure 10:
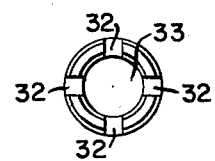
Fig. 10 is a bottom plan view of the shaft of Fig. 9.

As shown in Figs. 9 and 10, the lower end of each of the drive shafts 29, 30, is provided with four vertically disposed slots 32, open at their lower ends, and each of the shafts is centrally bored as indicated at 33 for reception of a beater shaft 26. Near its lower end, each of the shafts 29, 30, is externally grooved at 34 for reception of a beater retaining spring ring 35 which is internally contactible through the bore 33 and slots 32.

Each of the beater shafts 26 is provided with an ejecting ring 36 fixed on the shaft at a distance from its upper end and slightly below a pair of drive nibs 37 fixedly protruding from opposite sides of each beater shaft. To mount a beater shaft 26 in the drive shaft 29 or 30, the beater shaft is inserted into the bore 33, with the nibs 37 in opposite slots 32, and moved upwardly until the nibs have passed beyond the retaining spring ring 35 by momentarily expanding it. The drive shafts 29 and 30 are mounted in the casting 31 so that the slots 32 are in positions which enable them to receive the beater shaft nibs when the beaters of the two beater shafts interdigitate.

Fig. 2 shows the parts heretofore described in their normal positions in the gear housing 11. The drive shafts 29 and 30 are mounted to rotate in opposite directions by means of the worm wheels 28 meshing with the worm 27. The beater shafts 26 are operatively connected to the drive shafts 29 and 30 by means of the drive nibs 37 engaging the slots 32 of the drive shafts, the nibs being located above the beater retaining spring ring 35, with the ejecting rings 36 adjacent the bottom of the gear housing. The ejector body 13 is mounted in a recess in the casting 31 by the threaded upper end 23 of the bolt 14 engaging a threaded bore in the part 38 of the casting 31.

In this position, the spring 15 in the ejector is fully expanded, bearing at its upper end against the shoulder 18 of the ejector body 13 and at its lower end against the head 24 of the bolt 14. The lower face of the ejector arm 20 is closely adjacent the beater ejecting ring 36 of the left hand beater, and the lower face of the ejector arm 21 is slightly above the ejecting ring 36 of the right hand beater.

To eject the beater shafts 26, the operator applies pressure to the serrated face 16 of the ejector body 13, thereby compressing the spring 15 between the shoulder 18 and bolt head 24, as shown in Fig. 4, and forcing the ejector arm 20 into bearing contact with the ejecting ring 36 of the left hand beater 26. Slight downward movement of the ejector arm 20 forces the drive nibs 37 of the left hand beater to pass through the slots 32, past the spring ring 35, out of the drive shaft 30 and out through the aperture 22 in said ejector arm 20, whereupon the left hand beater shaft is released from the gear housing. As shown in Fig. 4, the release of the beater from the drive shaft 30 takes place before the ejector arm 21 engages the ejector ring 36 on the right hand beater and similarly releases it from the drive shaft 29.

Thus the ejection of the beaters is timed by the stepped arrangement of the ejector arms 20 and 21 to cause the drive nibs 37 of one beater shaft to pass through the retaining spring ring 35 on one drive shaft before the ejecting action takes place on the other beater shaft. After the manual pressure on the face 16 of the ejector 13 is released, the ejector body 13 returns to normal position as shown in Fig. 2 because of the expanding tendency of the spring 15. The form and construction of the ejector is designed to minimize the effort or pressure required to release the beater shafts from their respective drive shafts, and also to exert the ejecting pressure on the beater ejector rings in directions aligned with and parallel to the axis of the beater shafts, whereby the removal of the beater shafts is achieved without lateral strain on the contacting parts.

In describing the invention, reference has been made to a particular example embodying the same, but I wish it to be understood that the invention is not limited to the construction shown in the drawing nor to embodiment in a food mixer, and that various changes may be made in the construction and general arrangement of parts without departing from the invention.

I claim:

1. In a motor driven power unit comprising a pair of drive shafts and a tool shaft detachably connected to each of said drive shafts, ejector mechanism comprising an ejecting ring fixed on each tool shaft, a vertically bored ejector body having ejector arms extending in opposite directions for cooperating with said rings, each ejector arm having a bearing surface for contacting one of said rings, and means extending through said bored ejector body yieldingly mounting the body between said drive shafts, said ejector body and arms being manually depressible as a unit in a direction parallel to the axes of the tool shafts, the cooperating ejector arm and ring on one of the tool shafts being spaced apart a distance greater than the distance between the cooperating ejector arm and ring on the other tool shaft whereby one of said rings is contacted by an ejector arm before the other ring is similarly contacted during continued downwardly movement of the ejector body.

2. The ejector mechanism defined by claim 1, in which the ejector arms are apertured at their outer ends and a tool shaft extends through each of the apertured arms.

3. The ejector mechanism defined by claim 1, in which the ejector arms extend from the ejector body in different horizontal planes.

4. In a motor driven food mixer comprising a gear casing, a pair of drive shafts mounted in the casing and a beater shaft detachably connected to each of said drive shafts, the front face of the gear casing having an opening therein, ejector mechanism comprising an ejecting ring on each tool shaft, a vertically bored ejector having a serrated finger hold accessible through the opening in the front of the gear casing and having ejector arms extending in opposite direction below the gear casing for cooperating with said ejecting rings, each ejector arm having a bearing surface for contacting one of said rings, and means extending through said bored ejector body yieldingly mounting the body in the gear casing between said drive shafts, said ejector body and arms being manually depressible as a unit in a direction parallel to the axes of the tool shafts, the cooperating ejector arm and ring on one of the tool shafts being spaced apart a distance greater than the distance between the cooperating ejector arm and ring on the other tool shaft whereby one of said rings is contacted by an ejector arm before the other ring is similarly contacted during continued downward movement of the ejector body.

5. The ejector mechanism defined by claim 4, in which the ejector arms are apertured at their outer ends and a tool shaft extends through each of the apertured arms.

6. The ejector mechanism defined by claim 4, in which the ejector arms extend from the ejector body in different horizontal planes.

References Cited in the file of this patent
UNITED STATES PATENTS

| | | |
|---|---|---|
| 2,048,455 | Knapp | July 21, 1936 |
| 2,093,534 | Wright | Sept. 21, 1937 |